(12) United States Patent
Halasz et al.

(10) Patent No.: US 7,089,329 B1
(45) Date of Patent: *Aug. 8, 2006

(54) SUBSCRIPTION-BASED PRIORITY INTERACTIVE HELP SERVICES ON THE INTERNET

(75) Inventors: Sylvia Halasz, Fair Haven, NJ (US); Kamlesh T. Tewani, Freehold, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/881,632

(22) Filed: Jun. 30, 2004

Related U.S. Application Data

(63) Continuation of application No. 09/638,118, filed on Aug. 14, 2000, now Pat. No. 6,886,045.

(51) Int. Cl.
*G06F 15/16* (2006.01)

(52) U.S. Cl. ............ 709/245; 709/203; 709/219; 455/404.1; 701/3

(58) Field of Classification Search ........ 709/203–204, 709/217, 219, 245, 200; 455/404.1; 701/3
See application file for complete search history.

(56) References Cited

U.S. PATENT DOCUMENTS

| | | | |
|---|---|---|---|
| 4,216,545 A * | 8/1980 | Flickshu et al. ............ 455/77 |
| 5,157,615 A * | 10/1992 | Brodegard et al. ......... 701/301 |
| 5,694,537 A | 12/1997 | Montenegro et al. ........ 714/12 |
| 5,890,129 A | 3/1999 | Spurgeon |
| 6,052,574 A | 4/2000 | Smith, Jr. ................. 455/404 |
| 6,078,892 A | 6/2000 | Anderson et al. ............ 705/10 |
| 6,181,987 B1 | 1/2001 | Deker et al. .................. 701/3 |
| 6,246,361 B1 | 6/2001 | Weill et al. ............ 342/357.01 |
| 6,259,981 B1 | 7/2001 | Wilcosky ..................... 701/29 |
| 6,266,617 B1 | 7/2001 | Evans ........................ 701/29 |
| 6,295,608 B1 | 9/2001 | Parkes et al. .................. 714/1 |
| 6,383,135 B1 | 5/2002 | Chikovani et al. .......... 600/300 |
| 6,408,259 B1 * | 6/2002 | Goebel et al. ............. 702/183 |
| 6,535,743 B1 | 3/2003 | Kennedy et al. ......... 455/456.1 |
| 6,578,064 B1 * | 6/2003 | Saito et al. ................ 718/103 |
| 6,594,634 B1 | 7/2003 | Hampton et al. .............. 705/3 |
| 6,640,215 B1 | 10/2003 | Galperin et al. ............. 706/19 |
| 6,807,564 B1 * | 10/2004 | Zellner et al. ............. 709/206 |
| 6,886,045 B1 * | 4/2005 | Halasz et al. .............. 709/245 |
| 2001/0020229 A1 | 9/2001 | Lash ........................... 705/3 |
| 2004/0088345 A1 * | 5/2004 | Zellner et al. ............. 709/200 |

* cited by examiner

*Primary Examiner*—Saleh Najjar
*Assistant Examiner*—Oanh Duong

(57) ABSTRACT

The present invention includes a method and apparatus for providing an e-help service over a network. The e-help service provides one or more action sequences, i.e., recommended courses of action, for specialized circumstances over a network, such as an Internet Protocol network. Subscribers subscribe to specific application areas, such as one or more application areas related to a subscriber's industry. The e-help service provider maintains information pertaining to application areas in one or more databases. When a user activates the e-help service, information corresponding to the present conditions of the user's circumstance is transmitted to the e-help service provider. The e-help service provider identifies one or more action sequences based upon a statistical analysis of the information received from the user and information stored in a database corresponding to the application area of the user. The action sequences having a high probability of success are transmitted to the user and provide one or more recommended courses of action.

20 Claims, 6 Drawing Sheets

US 7,089,329 B1

SUBSCRIPTION-BASED PRIORITY INTERACTIVE HELP SERVICES ON THE INTERNET

RELATED APPLICATIONS

This application is a continuation of U.S. patent application Ser. No. 09/638,118, filed Aug. 14, 2000 now U.S. Pat. No. 6,886,045. U.S. patent application Ser. No. 09/375,792, entitled "Method And Apparatus For Providing An Emergency Message Service On A Network" and originally filed Aug. 17, 1999, and U.S. patent application Ser. No. 09/365,944, entitled "Apparatus And Method For Providing A High Priority Service For Emergency Messages On A Network" and originally filed Aug. 2, 1999, are assigned to the assignee of the present invention and are hereby incorporated by reference.

FIELD OF THE INVENTION

This invention relates to an apparatus and method for providing an emergency message service on a network.

BACKGROUND OF THE INVENTION

Currently, conventional emergency systems, such as 911 services, require that a user provide an emergency system operator with vital information related to the emergency in order for the emergency service provider to provide emergency help to the user. Such information can often be difficult to convey to an emergency system operator due to the trauma associated with an emergency, or simply a user's lack of knowledge of the vital information. Furthermore, for specialized circumstances, the recommended course of action may not be known or readily determined by an emergency system operator.

Hence, a need exists for providing help services over a network that can offer recommended courses of action, especially for specialized circumstances. In addition, a need exists for detecting present conditions of a user's circumstance without substantial interaction by a user, and transmitting the detected information to a service provider.

SUMMARY OF THE INVENTION

It is desirable for a help service provider to store information related to specialized areas in order to provide aid, such as a recommended course of action, to a user for circumstances relating to the specialized areas. It is also desirable to provide aid that is statistically calculated and optimized to benefit the user's current circumstance.

An aspect of the present invention provides a method that includes receiving data and identifying at least one action sequence based upon a statistical analysis of at least the received data. The step of identifying an action sequence further includes identifying at least one action sequence based upon a statistical analysis of the received data and stored data related to the received data and ranking each of the identified action sequences based upon probability of success. The method further includes optimizing each of the identified action sequences.

The method further includes comparing an alert level to a predetermined criterion when requested information is not received within a predetermined time period. A message is transmitted to at least one of a predetermined IP address and/or predetermined phone number, when the alert level is equal to a predetermined threshold.

In accordance with another aspect of the present invention, a system is provided that includes a network and a service provider. The service provider includes a processor, a database and a network interface. The service provider receives data, and the processor identifies at least one action sequence based upon a statistical analysis of the received data and information in the database related to the received data.

BRIEF DESCRIPTION OF THE DRAWINGS

The invention is described in detail with regard to the following figures, wherein like numeral references refer to like elements, and wherein.

DETAILED DESCRIPTION OF THE INVENTION

Figure 1:
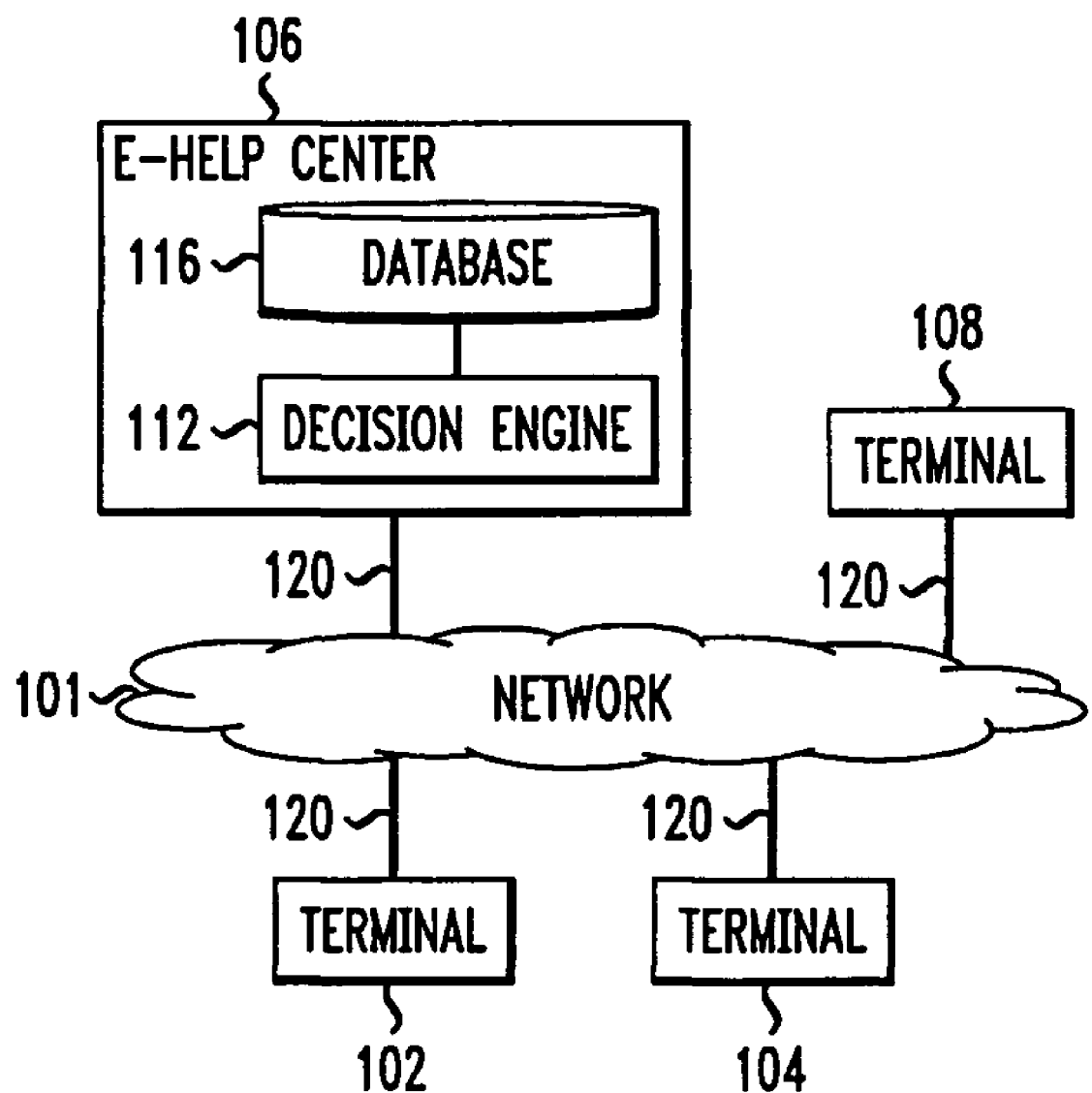
FIG. 1 is a schematic block diagram of an emergency service system according to the present invention.

FIG. 1 is an exemplary block diagram of an emergency service system 100 according to the present invention. System 100 includes terminals 102, 104 and 108 and e-help center terminal 106 coupled with network 101 via communication links 120. E-help center terminal 106 includes decision engine 112 and database 116.

Network 101 may be a single network or a plurality of networks of the same or different types. For example, network 101 may include a local telephone network in connection with a long-distance network (e.g., AT&T Worldnet). Further, network 101 may be a data network or a telecommunications network, e.g., AT&T's Internet network, in connection with a data network. Any combination of telecommunications and data networks may be used without departing from the spirit and scope of the present invention. For the purposes of discussion, it will be assumed that network 101 is an Internet Protocol network using high-priority routers for routing emergency messages, as described in U.S. patent application Ser. No. 09/365,944.

For example, network 101 is set up to prioritize emergency messages over non-emergency messages, which are transmitted and received by a terminal, such as the e-help center terminal 106. Network 101 can include a plurality of high-priority routers for transmitting various emergency messages between terminals connected with network 101. The high-priority routers can each include a plurality of high-priority queues into which emergency messages designated as having a high-priority are stored for immediate handling by the high-priority router. Each high-priority router can also include a regular priority queue in which data messages that do not include a high-priority designation are then stored for later handling by the high-priority router. Accordingly, when an emergency message having a high-priority designation is sent via network 101, each high-priority router recognizes the priority of the data message and handles the emergency message in an expedited manner relative to the regular non-priority messages. Thereby, network 101 can transfer messages, which may include numeric, graphic and voice information, in an expedited manner between terminals.

Furthermore, an emergency message may be configured to include a priority field in a header portion of the message that alerts the high-priority router of the priority designation. Alternatively, the high-priority router may be configured to automatically recognize messages being sent through e-help center terminal 106 to a particular emergency service-providing terminal, as having a priority designation. For example, all of the data messages that are being sent to an emergency service-providing terminal, such as a hospital, a police station or the like, can automatically be given a high-priority by the individual high-priority routers of the network 101.

The plurality of communication links 120 may be any type of connection that allows for the transmission of information. Communication links 120 may include wireless links to support, for example, mobile terminals or wire links. Some examples include conventional telephone lines, fiber optic lines, direct serial or parallel connections, coaxial cables, cellular telephone connections, satellite communication links, local area networks (LANs), intranets, and the like.

The terminals 102, 104, and 108 are maintained, for example, by subscribers to e-help center 106 and support organizations (e.g., hospitals, fire departments and ambulances). Terminals 102, 104 and 108 may be devices of any type that allow for the transmission and reception of communication signals. For example, terminals 102, 104, and 108 may be computers, telephones, facsimiles, cellular telephones, personal digital assistants, video telephones, telephone conference apparatuses, smart or computer assisted televisions, and the like. For the purposes of the following description of the present invention, it will be assumed that terminals 102, 104 and 106 are computers, which may be mobile or stationary.

Figure 2:
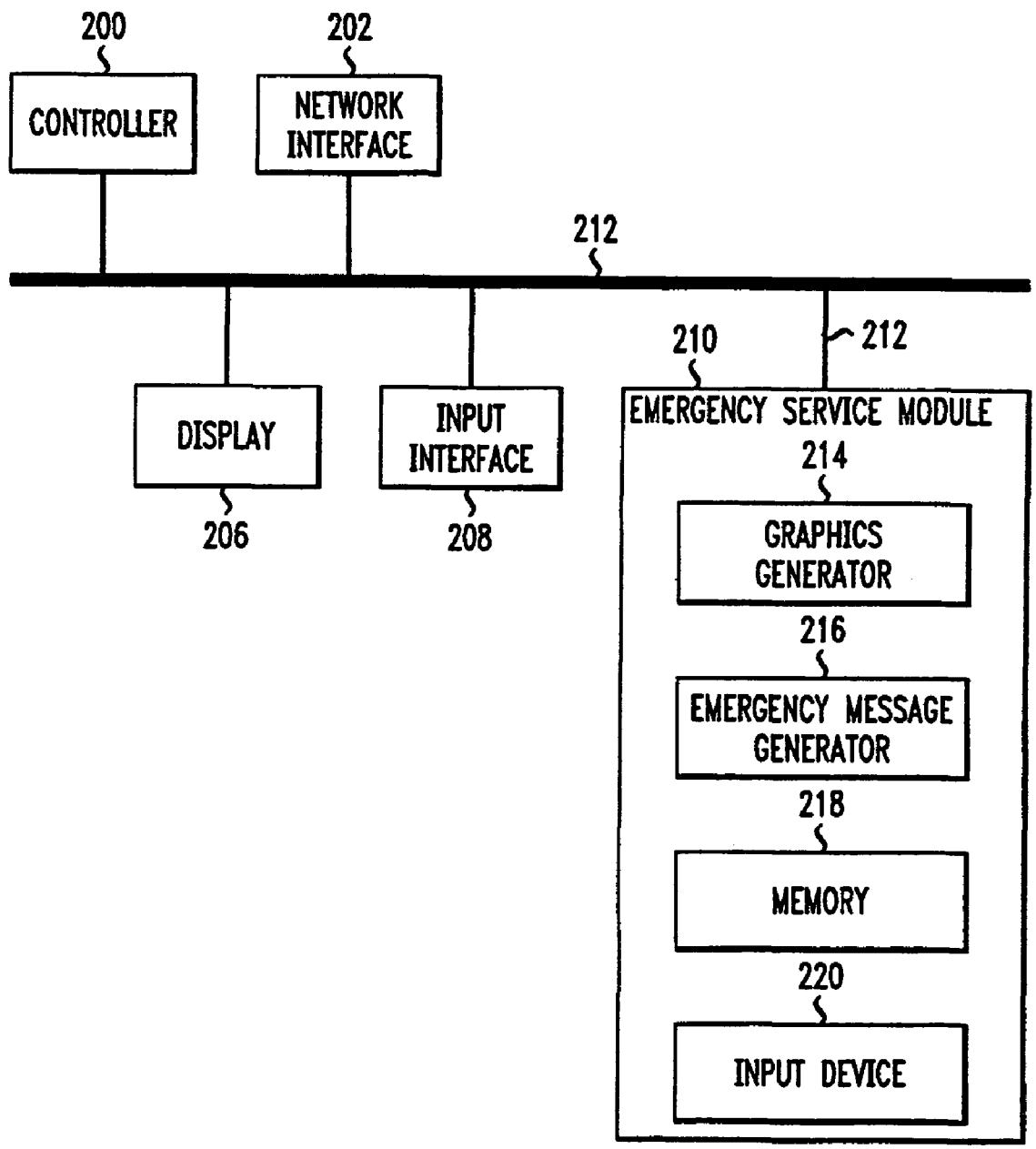
FIG. 2 is a schematic block diagram of the terminal device of FIG. 1 according to the present invention.

Terminals 102, 104 and 108 may include the terminals described in U.S. patent application Ser. No. 09/375,792, which provide icons in a graphical-user interface. FIG. 2 is an exemplary block diagram of a terminal, such as terminal 102, 104 or 108; however, terminal 102 is used in FIG. 2 for illustration purposes. The terminal 102, 104 or 108 includes a controller 200, a network interface 202, a display 206, an input interface 208, and an emergency service module 210. The above components are coupled together through control/signal bus 212. Terminals without graphics capabilities or even without a display (such as a telephone) can also be used.

The emergency service module 210 further includes a graphics generator 214, an emergency message generator 216, a memory 218 and an input device 220 that may include a sensor interface. The graphics generator and the sensor interface are optional. The emergency service module 210 can be a card containing the emergency services software and/or hardware that can be plugged into a user's terminal 102, 104 or 108 or a set of instructions that cause the user's terminal 102, 104 or 108 to operate in accordance with the present invention.

During operation of terminal 102, 104 or 108, for example, the emergency service module 210 instructs the controller 200 to display a high-priority icon on display 206 for selection by a user. The high-priority icon graphic can be generated by the graphics generator 214 and can further be a graphical icon on a computer's display, such as a graphic of an ambulance, or a button on a cellular phone which when depressed enables a user to rapidly compose and transmit an emergency message including urgent information to emergency service terminal 106. The high-priority icon can be generated by software or hardware on display 206.

During an emergency event, a user may select the high-priority icon by, for example, double-clicking on the icon to activate software that prompts the subscriber for information to be sent to e-help center terminal 106. After selecting the high-priority icon, the emergency service module 210 can instruct the controller 200 to subsequently display one or more dialog boxes on display 206 prompting the user for information.

The connection to the e-help center terminal can be established without the icon as well, by dialing a pre-specified telephone number or establishing contact to a pre-defined IP address.

Also, one or more sensors may be connected to emergency service module 210 via input device 220, such as a sensor interface. Module 210 of FIG. 2 may store information gathered by connected sensors and instruct controller 200 to send information from sensors to e-help center terminal 106 during an emergency event.

Each terminal 102, 104 and 108 includes an input interface 208 shown in FIG. 2, and the selections that are made by the user can be entered using any well-known input device connected to a terminal via input interface 208. For example, a user may enter a selection by touching a touch-sensitive display. Additionally, spoken commands may be translated by voice recognition algorithms into selections. Furthermore, the input interface 208 can be configured to remotely receive commands from a remote control carried by or on the user. Also, e-help center terminal 106 may include one or more input devices for maintaining and trouble-shooting equipment, such as servers 302, 304, 306 and 308 (shown in FIG. 3).

E-help center terminal 106 is maintained by the e-help service provider and includes database 116 and a decision engine 112 shown in FIG. 1 for providing, for example, instructions to a user's terminal, such as terminals 102, 104 and 108, during an emergency event and/or notification to support organizations (e.g., hospitals, ambulance services, fire department and police).

Figure 3:
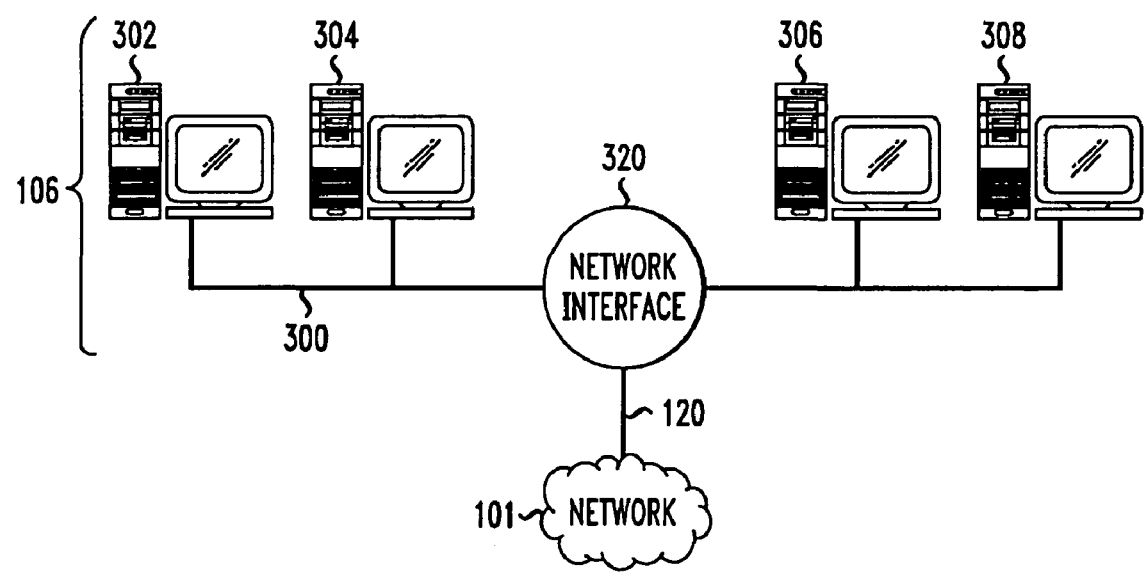
FIG. 3 is a schematic block diagram of an e-help center terminal coupled to the network according to the present invention.

For example, as shown in FIG. 3, e-help center terminal 106 may include LAN 300, having servers 302, 304, 306 and 308. Network interface 320, which may include an edge router, is used to connect e-help center terminal 106 to network 101 via communications link 120. Each server may include its own IP address and, for example, may be dedicated to a specific application area supported by the e-help service. Also, each server may include a database 116 that can store historical data and other information relevant to the application area the server is supporting. For example, server 302 may support an air travel application area, and database 116 in server 302 may include historical information related to past scenarios of air travel during storms, emergency landings and important geographical and meteorological data.

Decision engine 112 of the e-help center terminal 106 of FIG. 1 may include a processor used in a conventional server and software that runs algorithms for determining, for example, a recommended course of action for the subscriber. Each server 302, 304, 306 and 308 may include a decision engine 112. Decision engine 112 can use information provided by the subscriber, which may include sensor information, and information from database 116 to provide a recommended course of action during an emergency. Each server 302, 304, 306 and 308 may also include backup systems, such as backup power supplies and data storage, for minimizing down-time.

Figure 4:
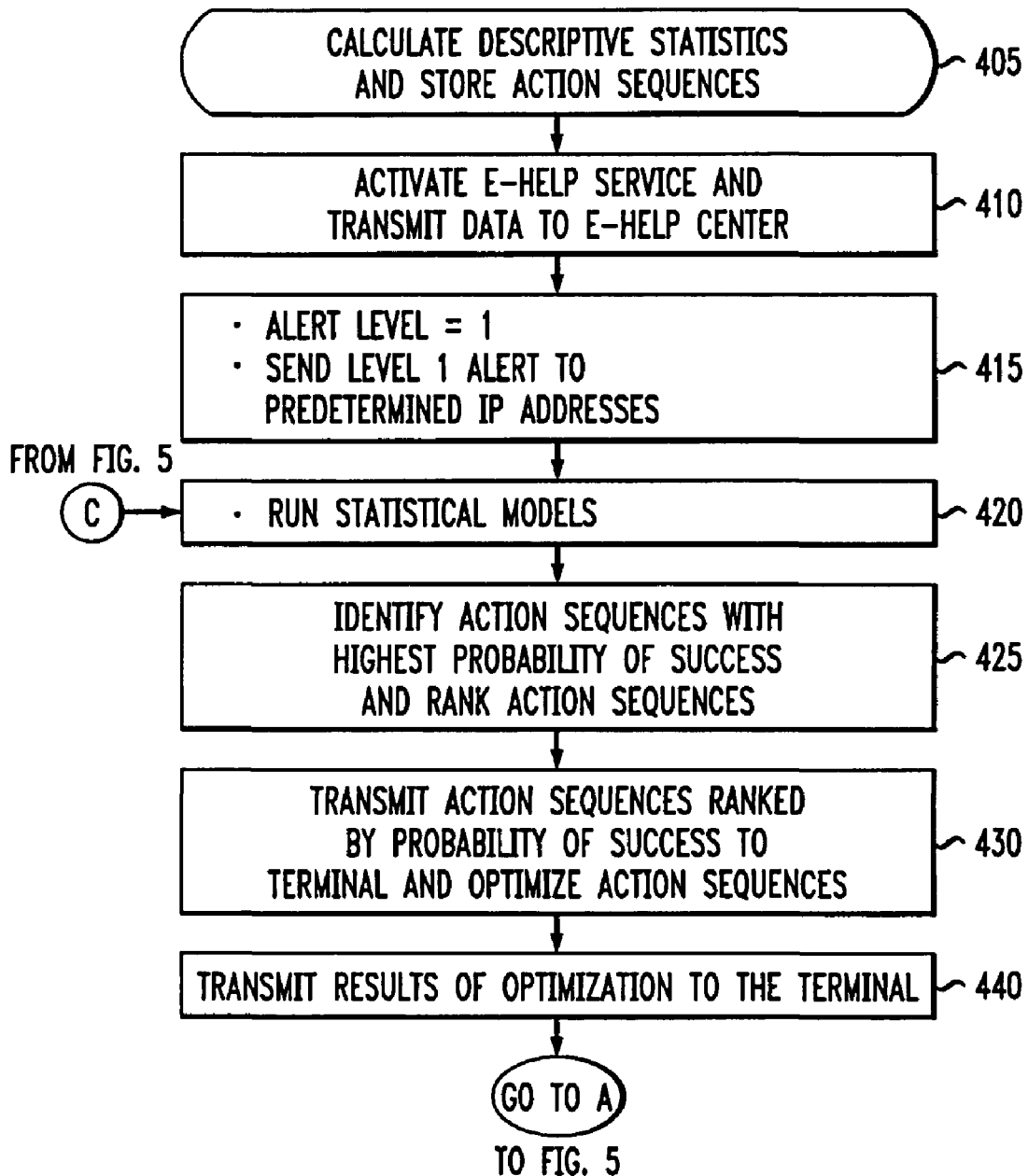
FIGS. 4–6 are flow-diagrams outlining exemplary processes for the present invention.

FIG. 4 is a flow-diagram of a preferred embodiment of the present invention for providing the e-help center service to subscribers. In order to provide a thorough understanding of the preferred embodiment, the steps shown in FIG. 4 are discussed with respect to the occurrence of an emergency, such as a fire in the cargo hold, taking place during a flight of an airplane. However, the e-help central service can be provided for terminals located in a variety of locations, such as a vehicle or building, and for a variety of applications. In addition, the e-help center service can be provided for emergency or non-emergency events.

In step 405 of FIG. 4 historical data including action sequences (i.e., recommended courses of action) are stored in database 116 of the e-help center terminal 106. Also, descriptive statistics are calculated using the historical data and stored in database 116. Historical data includes information relative to the application area that database 116 is supporting and can be provided by experts in the particular application areas and other reliable sources. Historical data also includes action sequences, which are optimized in step 430 for each emergency event. Descriptive statistics include, for example, mean and standard deviations calculated using historical data stored in database 116. For example, historical data including density of different air particles in an airplane are stored in database 116. Mean and standard deviations of acceptable densities of certain air particles (e.g., smoke particles) for an airplane cargo hold are calculated and stored in database 116. The mean and standard deviation of the density of the smoke particles are used to calculate a control limit (e.g., maximum density of smoke particles) for calibrating a smoke alarm in the airplane cargo hold during flight or at the terminal.

In step 410, the e-help center service is activated either by a user or automatically by controller 200 of terminal 102. The user, such as a pilot, can activate the e-help center service using input interface 208 in terminal 102, which is located in the airplane. Upon activation, data from sensors connected to emergency service module 210 via input device 220 is transmitted with a high-priority designation, for example, to an IP address of a server in e-help center terminal 106 that is designated for air-travel. Also, controller 200, located in terminal 102, can periodically monitor data from sensors connected to emergency service module 210 via input device 220. Controller 200 can automatically activate the e-help service and transmit sensor-data to e-help center terminal 106 after detecting an emergency event using the data from the sensors and relying on the decision engine 112. For example, controller 200 receives data including the density of smoke particles from the smoke detector calibrated in step 405 and compares the density to the control limit calculated in step 405 to detect an unacceptable density of smoke particles indicative of a fire. If an unacceptable density of smoke particles is detected, controller 200 transmits the data to e-help center terminal 106, and the e-help service is activated in step 410. Also, a user can input data via input interface 208 that relates to the current conditions of the present circumstance for which the user is requesting help to activate the e-help service in step 410.

In step 415, e-help center terminal 106 sets an alert level equal to one and sends level one alerts to predetermined IP addresses. For example, if an unacceptable density of smoke particles is detected, a level one alert is transmitted to a control tower for the nearest airport and a fire department in proximity to the airport.

In step 420, decision engine 112 of the e-help center terminal 106 runs a statistical model for determining the probability of success for possible action sequences based upon current conditions. The statistical model can include, for example, a logistic regression, a survival analysis model, such as the Cox survival model, or a rule-based system used in conjunction with a statistical model. For example, decision engine 112 runs a logistic regression model that has been fitted to historical data previously stored in database 116. Substituting the present values of the variables (e.g., from input interface 208 and/or from sensors connected to input device 220), this model calculates a value that increases as the probability of success increases.

For example, if an unacceptable density of smoke particles is detected, information such as the density of smoke particles, current location and amount of fuel is transmitted to e-help center terminal 106. The received information is used in a logistic regression model to calculate the probability of successful landing at different places, such as airports, highways, or even on the ocean. It also determines the steps necessary to achieve each solution.

From the results of the statistical modeling, decision engine 112 selects action sequences having a high probability of success and ranks the action sequences according to probability of success in step 425. Decision engine 112 can identify at least three action sequences having the three highest probabilities of success and can rank them from highest to lowest probability of success. For example, if the density of smoke particles detected in the cargo hold exceeds the control limit, decision engine 112 identifies the following ranked action sequences: (1) land at nearest airport, (2) land on nearest highway and (3) land immediately.

In step 430, the identified and ranked action sequences are transmitted to terminal 102 and notification of the identified action sequences is provided at terminal 102. Simultaneously, decision engine 112 optimizes the identified action sequences from step 425. Notification of the ranked action sequences at terminal 102 includes, for example, displaying by rank and/or audio notification. Optimization techniques performed by decision engine 112 include, for example, linear programming and stochastic programming. Optimization can be used to determine the best realization of an action sequence. For example, the airplane with the unacceptable density of smoke particles in the cargo hold is flying from New York to Geneva and has already left the coast. The identified action sequence having the highest probability of success is to turn around and land at the closest airport. The optimization will evaluate whether dumping fuel increases or decreases the probability of successful landing. Under some circumstances it increases this probability; but if the smoke is so strong that either immediate malfunction of some equipment or the loss of mental alertness of personnel is a factor, then dumping the fuel decreases the probability of success. Optimization uses the information stored in the database 116 related to, for example, information about earlier similar events, results of simulation studies and opinions of expert panels. Decision engine 112 transmits the results of the optimization to terminal 102 in step 440, and terminal 102 provides notification of the optimized results, for example, by displaying the results and/or providing audio notification.

Figure 5:
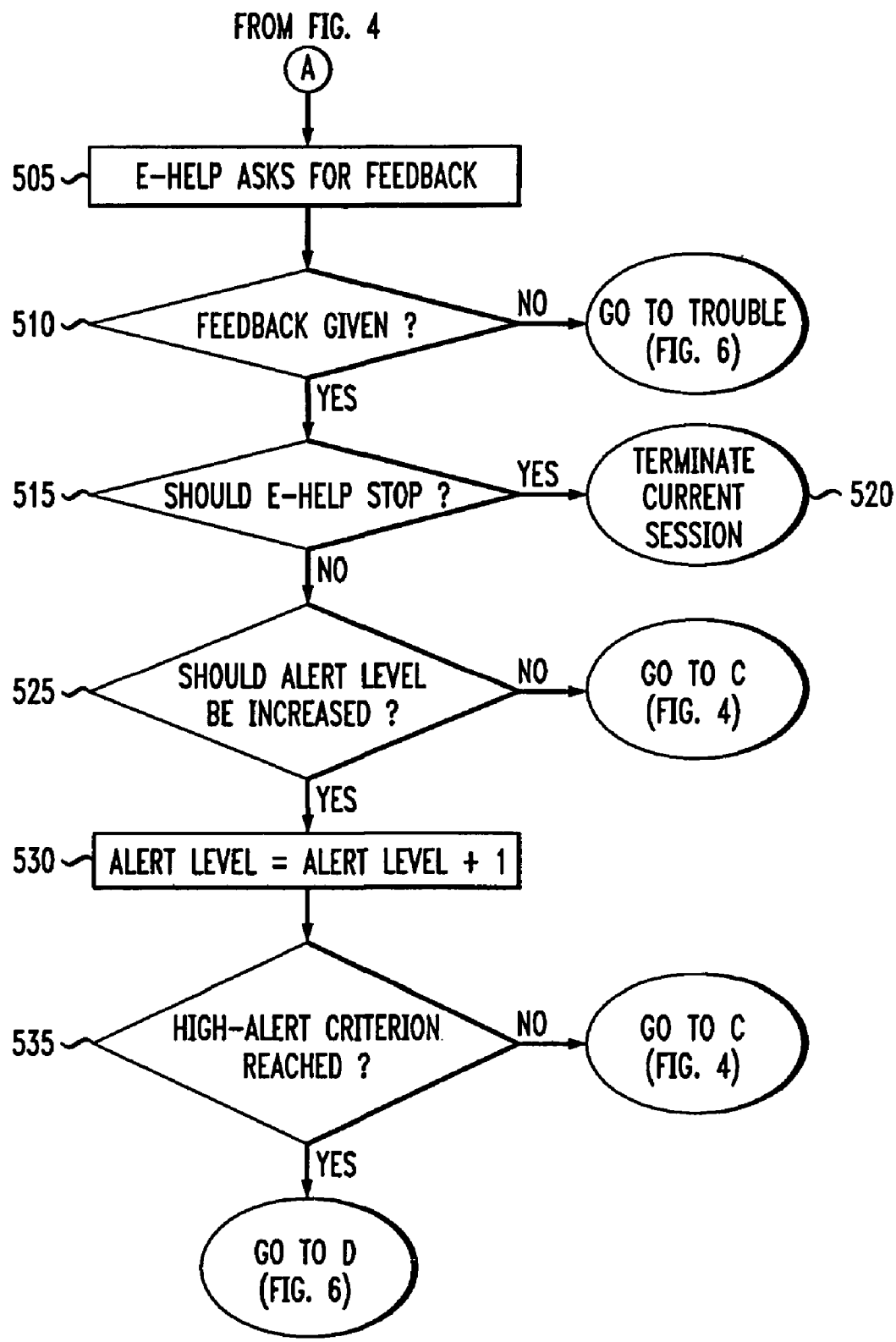

Because two-way communication between the user and e-help center terminal 106 is established, e-help center terminal 106 can request feedback from the user after providing notification. After the results of the optimization are transmitted to terminal 102, e-help center terminal 106 can request feedback from the user in step 505 (FIG. 5). For example, for the airplane containing terminal 102, e-help center terminal 106 can request feedback concerning the present condition of the pilot and the airplane's system. In step 510, decision engine 112 determines whether feedback has been provided. For example, decision engine 112 can determine whether e-help center terminal 106 has received any data from terminal 102 within a predetermined time of requesting the feedback. If feedback is not received from terminal 102 within the predetermined time, the alert level is increased in step 605 of FIG. 6. If feedback is received from terminal 102 within a predetermined time, e-help center terminal 106 ascertains whether to continue the e-help service in step 515. For example, the user may be prompted with a question asking the user whether to continue the e-help service or terminate the current session. If the user sends a request to terminate the e-help service, the service is terminated in step 520. If the user sends a request to continue the service, decision engine 112 determines whether the alert level should be increased in step 525. Based on sensor-data received from terminal 102 and/or user feedback indicating a high level of emergency, decision engine 112 determines whether to increase the alert level by one in step 530. For example, using the data transmitted from terminal 102, decision engine 112 may determine that the amount of smoke in the cargo hold is increasing rapidly and other airplane systems are malfunctioning. Therefore, decision engine 112 increases the alert level in step 530. Also, the user may provide feedback indicating an increased state of emergency, and decision engine 112 increases the alert level. In step 535, decision engine 112 determines whether the alert level has reached a high-alert criterion by comparing the alert level to the high-alert criterion. If the alert level equals the high-alert criterion, e-help center terminal 106 sends a high-alert level notification to predetermined IP addresses and/or phone numbers of, for example, hospitals and other emergency service providers in close proximity in step 620 of FIG. 6. If the high-alert criterion is not reached, statistical models are run in step 420. Also, if decision engine 112 determines that the alert level should not be increased in step 525, statistical models are run in step 420.

Figure 6:
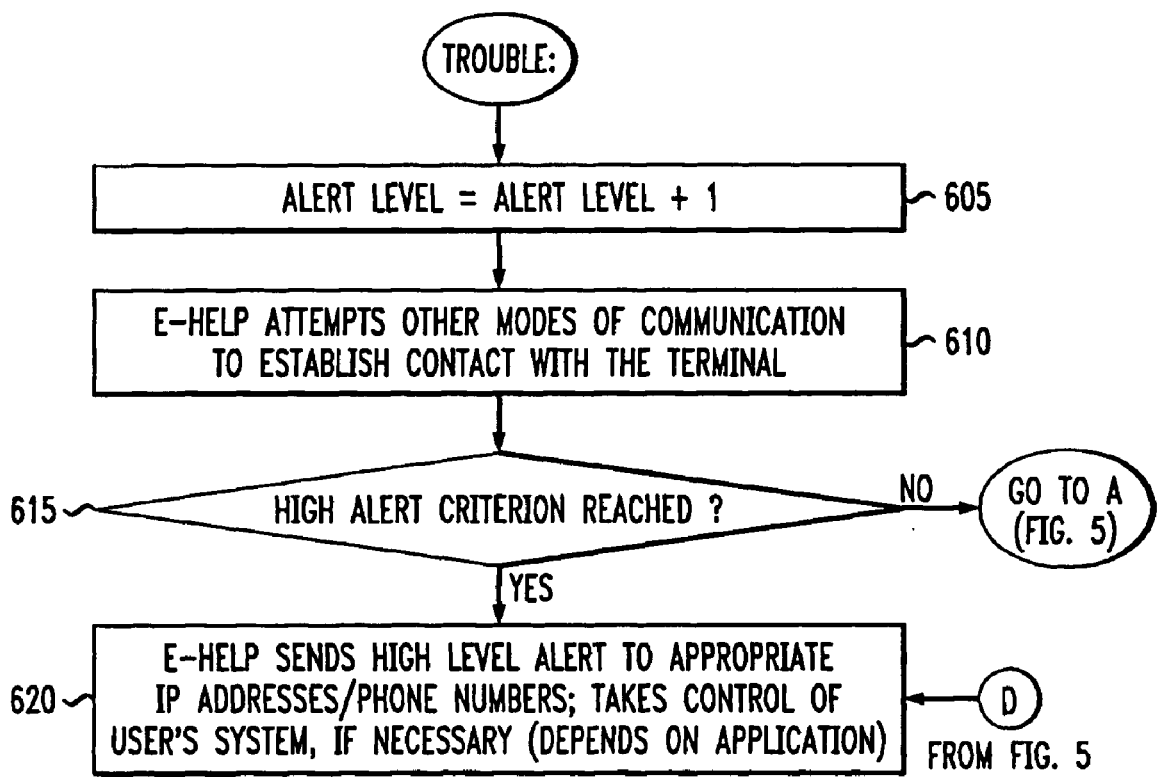

If no feedback is provided by the user within a predetermined time period in step 510, the alert level is increased by one in step 605 of FIG. 6, and e-help center terminal 106 attempts to contact terminal 102 using other modes of communication in step 610. Also, the feedback provided by the user or the data from the sensors transmitted to e-help center terminal 106 may indicate that the alert level should be increased. For example, using the data transmitted from the airplane, decision engine 112 may determine that the amount of smoke is increasing rapidly and other airplane systems are malfunctioning. Therefore, decision engine 1112 automatically increases the alert level. Also, the user may provide feedback indicating an increased state of emergency, and decision engine 112 increases the alert level. In step 615, the alert level is compared to the predetermined high-alert criterion. If the alert level equals the high-alert criterion, e-help center terminal 106 sends a high-alert level notification to predetermined IP addresses and/or phone numbers of, for example, hospitals and other emergency service providers in close proximity and step 620 is deployed. The predetermined IP addresses and phone numbers can be application specific. In step 615, if the alert level is not equal to the high-alert criterion, e-help center terminal 106 requests feedback, as shown in step 505.

In addition to emergency help, the e-help service can provide non-emergency help to subscribers. Non-emergency help may not use high-priority designations for routing. Also, non-emergency help may be elevated to emergency help, upon recognition of emergency conditions.

Also, the e-help service is subscription-based. Subscribers subscribe to application-specific areas and can be billed according to each subscribed application. Billing may be on a per-use or periodic, such as monthly, basis. Also, subscribers can have access to the e-help service for application areas not previously subscribed to, but subscribers may be billed at a higher rate for those services.

What has been described are the preferred embodiments of the present invention. It, however, will be apparent to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

What is claimed is:

1. A method for providing emergency help services comprising steps of:
   receiving data; and
   identifying at least one action sequence based upon a statistical analysis of at least the received data;
   transmitting at least one action sequence to a terminal;
   establishing different alert levels that correspond to responses to different states of emergency, including at least a low-level alert and a high-level alert;
   transmitting a request for feedback to the terminal;
   increasing the alert level when either the requested feedback is not received within a predetermined time or the requested feedback indicates a need for assistance by emergency service providers;
   comparing the alert level to a predetermined criterion when the requested information is not received within a predetermined time period; and
   transmitting a message to at least one of a predetermined IP address and a predetermined phone number of an emergency service provider when the alert level equals the predetermined criterion.

2. The method of claim 1, wherein the step of identifying at least one action sequence further comprises a step of:
   identifying at least one action sequence based upon statistical analysis of the received data and stored data related to the received data.

3. The method of claim 2, wherein the step of identifying at least one action sequence further comprises a step of:
   identifying at least one action sequence having a high probability of success.

4. The method of claim 3, wherein the step of identifying at least one action sequence further comprises a step of:
   calculating descriptive statistics using the stored data.

5. The method of claim 3, wherein the step of identifying at least one action sequence having a high probability of success further comprises steps of:
   running a statistical model using the received data to identify action sequences having a high probability of success;
   selecting a plurality of action sequences having the highest probability of success among the action sequences identified by running the statistical model; and
   ranking each of the identified action sequences based upon probability of success.

6. The method of claim 5, further comprising a step of:
   optimizing each ranked action sequence based upon the received data.

7. The method of claim 6, wherein the step of optimizing each ranked action sequence further comprises a step of:
   optimizing each ranked action sequence using any one of linear programming and stochastic programming.

8. The method of claim 6 further comprising a step of:
transmitting each optimized action sequence to a terminal.

9. The method of claim 5, wherein the step of running a statistical model further comprises a step of:
running a statistical model that includes any one of a logistic regression model and a survival analysis model.

10. An emergency help system providing messages over a network comprising:
a network; and
a service provider, the service provider including a processor, at least one database and a network interface, wherein the service provider receives data, and the processor identifies at least one action sequence based upon a statistical analysis of the received data and information in the at least one database related to the received data, the service provider
transmitting at least one action sequence to a user;
establishing different alert levels that correspond to responses to different states of emergency, including at least a low-level alert and a high-level alert;
transmitting a request for feedback to a user;
increasing the alert level when either the requested feedback is not received within a predetermined time or the requested feedback indicates a need for assistance by emergency service providers;
comparing the alert level to a predetermined criterion when the requested information is not received within a predetermined time period; and
transmitting a message to at least one of a predetermined IP address and a predetermined phone number of an emergency service provider when the alert level equals the predetermined criterion.

11. The system of claim 10, wherein the statistical analysis includes ranking each of the identified action sequences based upon probability of success.

12. The system of claim 11, wherein the statistical analysis includes calculating descriptive statistics using the stored information and running statistical models based upon the received data.

13. The system of claim 12, wherein the processor optimizes each identified action sequence.

14. The system of claim 13, wherein the service provider transmits each identified action sequence.

15. The system of claim 10, wherein the network includes an Internet Protocol network.

16. The system of claim 10, wherein the at least one database includes a plurality of databases, and each of the plurality of databases stores information related to a distinct application area.

17. The system of claim 10, further comprising a user terminal including a controller, a network interface, an input interface, a display and an emergency module, wherein the user terminal is coupled to the network via the network interface and the user terminal transmits the data to the service provider via the network.

18. The system of claim 17, wherein the service provider transmits the identified at least one action sequence to the user terminal through the network, and the user terminal displays the identified at least one action sequence on the display.

19. The system of claim 18, wherein the emergency service provider includes a sensor interface coupling the user terminal with at least one sensor.

20. The system of claim 19, wherein the data received by the service provider is data transmitted from the user terminal that includes any one of data from the at least one sensor, data input by a user via the user interface and data from both the at least one sensor and input by a user via the user interface.

* * * * *